US005659756A

United States Patent [19]
Hefferon et al.

[11] Patent Number: 5,659,756
[45] Date of Patent: Aug. 19, 1997

[54] METHOD AND SYSTEM FOR PROVIDING ACCESS TO LOGICAL PARTITION INFORMATION ON A PER RESOURCE BASIS

[75] Inventors: Eugene Paul Hefferon, Poughkeepsie; Jeffrey Paul Kubala, Poughquag; Rodney Allen Paul, Kingston; John Scott Trotter, Pleasant Valley, all of N.Y.

[73] Assignee: International Business Machines Corporation, Armonk, N.Y.

[21] Appl. No.: 414,088

[22] Filed: Mar. 31, 1995

[51] Int. Cl.⁶ .................................................. G06F 7/04
[52] U.S. Cl. ............................................ 395/726; 395/601
[58] Field of Search ...................................... 395/600, 724

[56] References Cited

U.S. PATENT DOCUMENTS

| | | | |
|---|---|---|---|
| 4,300,192 | 11/1981 | Couleur et al. | 395/480 |
| 4,396,984 | 8/1983 | Videki, II | 395/358 |
| 4,564,903 | 1/1986 | Guyette et al. | 395/411 |
| 4,843,541 | 6/1989 | Bean et al. | 395/856 |
| 5,121,390 | 6/1992 | Farrell et al. | 370/94.1 |
| 5,155,837 | 10/1992 | Liu et al. | 395/500 |
| 5,206,933 | 4/1993 | Farrell et al. | 395/200.2 |
| 5,210,844 | 5/1993 | Shimura et al. | 395/480 |
| 5,218,680 | 6/1993 | Farrell et al. | 395/200.06 |
| 5,253,344 | 10/1993 | Boshick et al. | 395/275 |
| 5,263,158 | 11/1993 | Janis | 395/600 |
| 5,339,403 | 8/1994 | Parker | 395/425 |

OTHER PUBLICATIONS

"Input/Output Configuration Users's Guide and Escon Channel-to-Channel Reference" IBM, Pub #GL38-0401-01 May 94.
IBM System/37D Extended Architecture (S/37QXA) Pub #SA22-7095-01 Sep. 85.

*Primary Examiner*—Jack B. Harvey
*Assistant Examiner*—David A. Wiley
*Attorney, Agent, or Firm*—Lawrence D. Cutter, Esq.; Heslin & Rothenberg, P.C.

[57] ABSTRACT

An access method and system in a logically partitioned data processing system having a plurality of logical partitions. A requesting logical partition requests information pertaining to a resource of the data processing system as the resource relates to a requested logical partition of the system. The requesting logical partition is given access to the information when the requesting and requested logical partitions are authorized to access the resource. Thus, access to logical partition information is provided on a per resource basis. Additionally, access is limited such that the requesting logical partition can access information relating to less than all of the logical partitions of the logically partitioned data processing system.

26 Claims, 5 Drawing Sheets

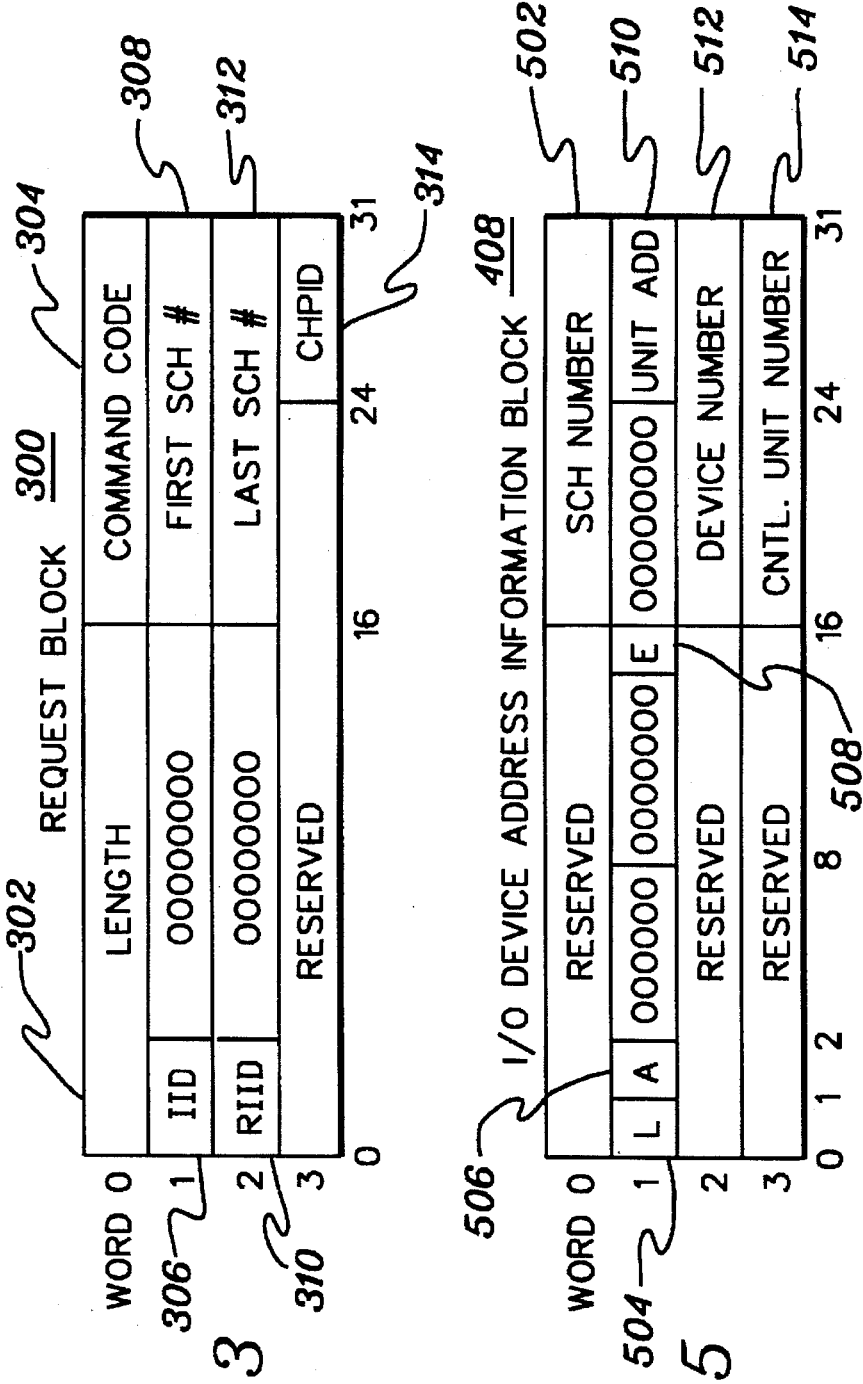

METHOD AND SYSTEM FOR PROVIDING ACCESS TO LOGICAL PARTITION INFORMATION ON A PER RESOURCE BASIS

TECHNICAL FIELD

This invention relates in general to logically partitioned data processing systems and, in particular, to providing at least one of a plurality of logical partitions with the ability to access logical partition information on a per resource basis.

BACKGROUND ART

As is known, in a logically partitioned data processing system, the resources of the system are partitioned into a plurality of logical partitions enabling a multitude of system control programs (e.g., operating systems) to run simultaneously in the different partitions. One embodiment of a logically partitioned data processing system is described in U.S. Pat. No. 4,843,541, entitled "Logical Resource Partitioning of A Data Processing System," Bean et al., issued on Jun. 27, 1989 and assigned to International Business Machines Corporation, which is hereby incorporated herein by reference in its entirety.

Each logical partition of a logically partitioned data processing system has its own resources, including for example, main storage, expanded storage, channels and subchannels, and thus, operates independently of the other logical partitions. Typically, a logical partition has access to information relating to its own resources. However, at times, it is desirous to obtain information about resources as they relate to other partitions in the data processing system. In prior systems, this was accomplished by granting a logical partition global access to such information. That is, the logical partition is granted access to information pertaining to the resources for all of the logical partitions.

The restricted and global accesses of known systems have various pitfalls. For example, limited access is inadequate, since the logical partition can acquire information only about its own resources. Additionally, global access is inadequate, since a logical partition can acquire information relating to all of the logical partitions, even those requiring a higher security. Thus, a need exists for a limited global access mechanism in which access to logical partition information is restricted. A further need exists for a mechanism that allows information to be obtained about a resource as that resource relates to less than all of the logical partitions in a data processing system. A further need exists for the capability to limit the access of information to a per resource basis. A yet further need exists for a technique to provide greater flexibility in controlling access to logical partition information.

SUMMARY OF THE INVENTION

The shortcomings of the prior art are overcome and additional advantages are provided through the provision of an access method in a logically partitioned data processing system having a plurality of logical partitions. A first logical partition of the plurality of logical partitions requests access to information pertaining to a resource of the logically Partitioned data processing system as that resource relates to a second logical partition of the plurality of logical partitions. Each of the first and second logical partitions executes a system control program. A determination is made as to whether the first logical partition is authorized to access the information. The determination includes establishing whether the first logical partition and the second logical partition have authority to access the resource. When the first and second logical partitions have authority to access the resource, the first logical partition is allowed to access the information.

In one embodiment, the first logical partition issues an instruction requesting access to the information. The instruction includes a resource identifier indicating the resource and a requested identifier specifying the second logical partition.

In a further embodiment, the first logical partition has a requesting identifier and an authorization list for the resource is checked to establish whether the first and second logical partitions have authority to access the resource. If the requesting and requested identifiers are on the authorization list, then the first and second logical partitions have authority to access the resource.

In yet a further embodiment of the invention, the logically partitioned data processing system also includes an input/output processor coupled to the plurality of logical partitions and one or more input/output devices coupled to the input/output processor. The input/output processor is used to execute the instruction requesting access to the information.

In still another embodiment, the resource is a path between the input/output processor and one of the input/output devices. Additionally, the instruction returns to the first logical partition information regarding the path.

In another aspect of the present invention, an access method in a logically partitioned data processing system having at least three logical partitions is provided. A first logical partition executing a system control program requests access to partition information relating to a second logical partition of the data processing system, which is also executing a system control program. A determination is made as to whether the first logical partition, which has authority to access information for less than all of the at least three logical partitions of the data processing system, has authority to access the partition information. If the first logical partition has the proper authority, then access to the information is granted.

In one embodiment of the invention, the first logical partition requests access to partition information pertaining to a resource of the logically partitioned data processing system, and the first logical partition is granted access to the partition information when the first and second logical partitions have authority to access the resource.

In a further aspect of the present invention, a logically partitioned data processing system is provided. In one embodiment of the invention, the system includes a plurality of logical partitions and a processor. A first logical partition of the plurality of logical partitions is programmable to request access to information pertaining to a resource of the logically partitioned data processing system as the resource relates to a second logical partition of the system. A system control program is executable by the first logical partition and the second logical partition. The processor is coupled to the plurality of logical partitions, and is programmable to determine whether the first logical partition is authorized to access the information and whether the first logical partition and the second logical partition have authority to access the resource. The processor allows the first logical partition to access the information when the first logical partition and the second logical partition have authority to access the resource.

In yet another embodiment of the invention, a logically partitioned data processing system having at least three logical partitions is provided. A system control program is executable by a first and a second logical partition of the at least three logical partitions. The first logical partition is programmable to request access to partition information relating to the second logical partition. A processor is coupled to the at least three logical partitions, and is programmable to determine whether the first logical partition is authorized to access the partition information. The first logical partition has authority to access information for less than all of the at least three logical partitions. The processor allows the first logical partition to access the partition information when the first logical partition is authorized.

In yet another aspect of the invention, an access system in a logically partitioned data processing system including a plurality of logical partitions is provided. A system control program is executable by a first and a second logical partition of the logically partitioned data processing system. In one embodiment, the system includes means for requesting access by the first logical partition to information pertaining to a resource of the logically partitioned data processing system as the resource relates to the second logical partition. Additionally, the system includes means for determining whether the first logical partition is authorized to access the information. The determining means includes means for establishing whether the first logical partition and the second logical partition have authority to access the resource. Means are also included for allowing the first logical partition to access the information when the first logical partition and the second logical partition have authority to access the resource.

In still another aspect of the invention, an access system in a logically partitioned data processing system including at least three logical partitions is provided. A system control program is executable by a first and a second logical partition of the logically partitioned data processing system. The system includes, for example, means for requesting access by the first logical partition to partition information relating to the second logical partition. Also, the system includes means for determining whether the first logical partition is authorized to access the partition information. The first logical partition has authority to access information for less than all of the at least three logical partitions in the logically partitioned data processing system. Further, the system includes means for allowing the first logical partition to access the partition information when the first logical partition is authorized.

The access method and system of the present invention advantageously give the user of a data processing system with configuration management authority (e.g., a system administrator) the capability to limit the scope of access to partition information on a per resource basis. That is, in order for a requesting logical partition to gain access to information pertaining to a resource as it relates to a requested logical partition, both the requesting and requested logical partitions need to have authority to access the resource. This gives the system administrator greater flexibility to control access to logical partition information. It further allows those partitions requiring a high level of security to remain secure by not authorizing those partitions for a particular resource.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings in which:

FIG. 2 depicts one example of a channel subsystem call instruction issued when one partition of the system of FIG. 1 wishes to retrieve information relating to another partition of the system, in accordance with the principles of the present invention;

FIG. 3 depicts one embodiment of a request block used in the channel subsystem call instruction of FIG. 2, in accordance with the principles of the present invention;

FIG. 5 depicts one example of an input/output (I/O) device address information block incorporated within the response block of FIG. 4, in accordance with the principles of the present invention;

BEST MODE FOR CARRYING OUT THE INVENTION

In accordance with the principles of the present invention, a logical partition is provided with limited global access to information relating to other logical partitions of a logically partitioned data processing system. In particular, in one example, a logical partition is given authority to access information pertaining to a specified resource as that resource relates to another logical partition of the data processing system. In accordance with the principles of the present invention, access is granted when both logical partitions have authority to access the resource. Thus, in one embodiment, access to information relating to a particular partition is tied to a given resource, as described in further detail below.

The inventive technique of the present invention allows a logical partition to access information relating to fewer than all of the logical partitions of the data processing system. This enables partitions to be grouped by security requirements. Thus, if a particular logical partition has a greater security requirement than other logical partitions, then access will be denied for that partition. In one example, this is accomplished by denying that partition access to a particular resource, while allowing the other partitions such access.

Figure 1:
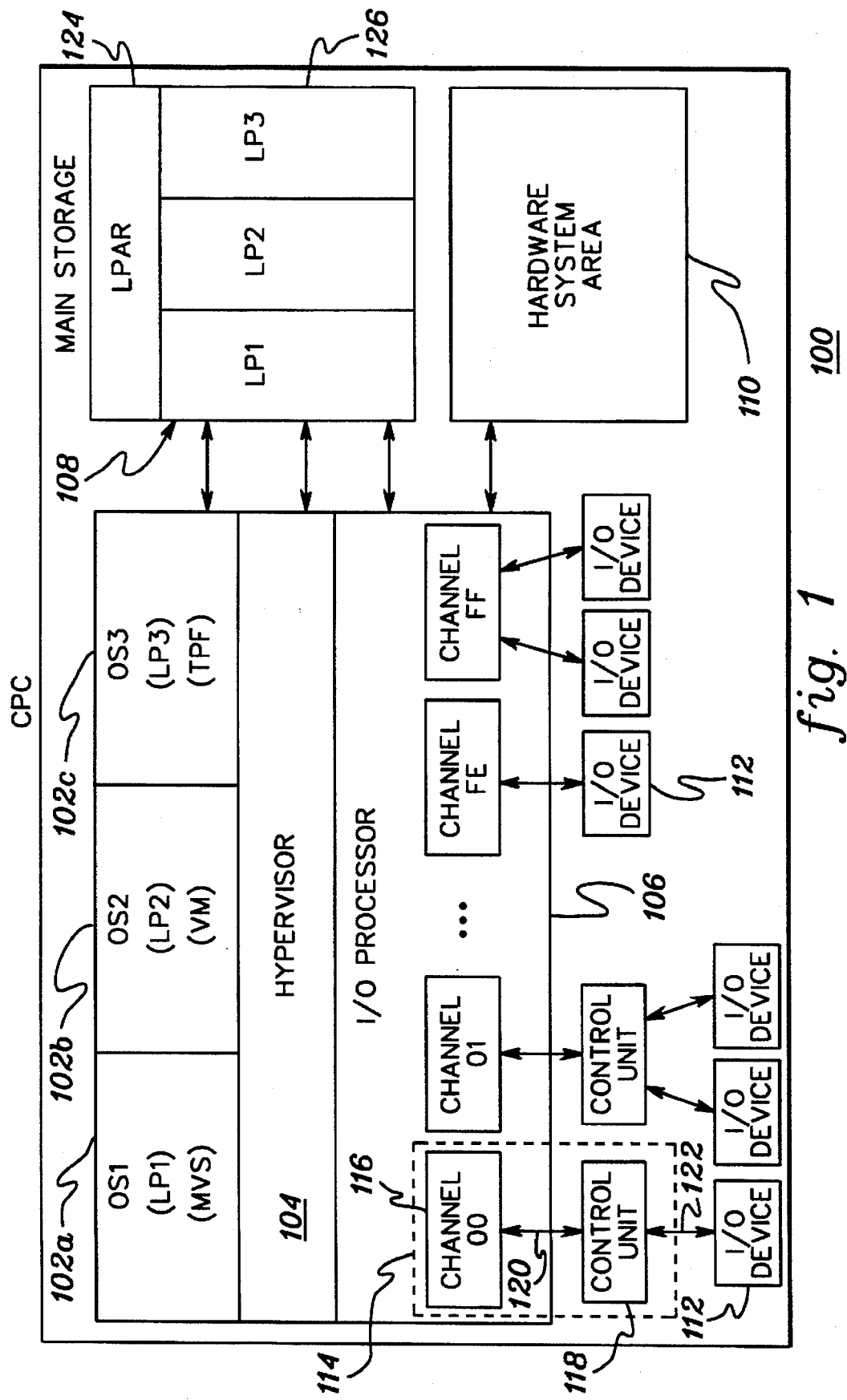
FIG. 1 depicts one example of a logically partitioned data processing system incorporating the access method and system of the present invention.

One example of a logically partitioned data processing system incorporating the limited global authority mechanism of the present invention is depicted in FIG. 1. In one embodiment, a central processing complex (CPC) 100 is logically partitioned into a plurality of logical partitions (LP1, LP2, LP3) 102a–102c (hereinafter, collectively referred to as logical partitions 102), and includes, for example, a hypervisor 104, an input/output (I/O) processor 106, a main storage 108 and a hardware system area (HSA) 110. Each of these components is described in detail below.

In one embodiment of the present invention, each of logical partitions 102 executes a system control program (also referred to as an operating system image). In one example, each logical partition runs a different system control program. For instance, as depicted in FIG. 1, logical partition 102a executes a Multiple Virtual Storage (MVS) operating system (OS1), logical partition 102b executes a Virtual Machine (VM) operating system (OS2) and logical partition 102c executes a Transaction Processing Facility (TPF) operating system (OS3), all offered by International Business Machines Corporation and known to those skilled in the relevant art. In other examples, some or all of the logical partitions can run a copy of the same operating system image either in the same architected mode, different architected modes or some combination of the above.

As is known, each logical partition is assigned system resources allowing each logical partition to run independently of the other logical partitions. Although the partitions run independently, they may share some system resources. System resources include, for instance, main storage, extended storage, channels, subchannels and central processors.

Although only three logical partitions are depicted in FIG. 1, it would be apparent to one of ordinary skill in the art that logically partitioned data processing system 100 may include fewer or more than three logical partitions and that the depiction of three logical partitions is only illustrative and exemplary.

Logical partitions 102 are coupled to hypervisor 104, which is used to manage the logical partitions. For example, hypervisor 104 (also referred to as an LPAR supervisor) is responsible for dispatching units within logical partitions 102 onto physical processors (not shown) which are coupled to logical partitions 102. Additionally, hypervisor 104 manages various system requests and sets up authorization mechanisms for the logical partitions.

Hypervisor 104 is also coupled to I/O processor 106. I/O processor 106, which includes in one example, a channel subsystem, directs the flow of information between one or more input/output devices 112 and main storage 108. It relieves the central processing units of the task of communicating directly with input/output devices 112 and permits data processing to proceed concurrently with input/output processing. In one example, I/O processor 106 uses one or more channel paths 114 (described below) as the communication links in managing the flow of information to or from input/output devices 112. As a part of the input/output processing, I/O processor 106 also performs the path-management function of testing for channel path availability, selecting an available channel path and initiating execution of the operation with the input/output device.

Each channel path 114 includes, for instance, a channel 116, one or more control units 118 and one or more links 120. As shown in FIG. 1, certain channels (e.g., open system adapter (OSA) channels, e.g., channel FE and channel FF)) integrate the channel, control units and links as one integral unit, which is represented by the channel. (In another example, it is also possible to have one or more dynamic switches as part of the channel path. A dynamic switch is coupled to a channel and a control unit and provides the capability of physically interconnecting any two paths that attach to the switch.) Each channel path has a corresponding channel path identifier (CHPID).

Also located within I/O processor 106 are subchannels (not shown). One subchannel is provided for and dedicated to each input/output device accessible to the I/O processor. A subchannel provides the logical appearance of a device to the system control program. Each subchannel provides information concerning the associated input/output device and its attachment to the I/O processor. The subchannel also provides information concerning input/output operations and other functions involving the associated input/output device. The subchannel is the means by which I/O processor 106 provides information about associated input/output devices to the central processing units, which obtain this information by executing input/output instructions.

In one embodiment, I/O processor 106 is coupled to one or more control units 118 via one or more links 120. Each control unit provides the logic to operate and control one or more of input/output devices 112 and adapts, through the use of common facilities, the characteristics of each input/output device to the link interface provided by the channel. The common facilities provide for the execution of input/output operations, indications concerning the status of the input/output device and control unit, control of the timing of data transfer over the channel path and certain levels of input/output device control.

Each control unit is attached via, for example, a bus 122 to one or more input/output devices 112. In one embodiment, each control unit may be attached to up to 256 input/output devices. Input/output devices 112 receive information from and store information in main storage 108. Examples of input/output devices 112 include card readers and punches, magnetic tape units, direct access storage devices, displays, keyboards, printers, teleprocessing devices, communication controllers and sensor-based equipment.

Coupled to logical partitions 102, hypervisor 104 and I/O processor 106 is main storage 108. In one embodiment, main storage 108 is partitioned into storage associated with hypervisor 104 (i.e., LPAR 124), and storage for each logical partition 102 (e.g. LP1, LP2, LP3 at reference numeral 126). As one example, logical partition 102a can access storage LP1, while logical partitions 102b and 102c can access LP2 and LP3, respectively. Logical partitions 102 do not have access to LPAR storage 124.

In addition to main storage 108, is hardware system area 110, which is coupled to I/O processor 106. In one example, hardware system area 110 includes image information for each of logical partitions 102 (such as, e.g., subchannel information), as well as information for each channel path within I/O processor 106. For example, within hardware system area 110 is a control block for each channel path, which includes, for instance, a reconfiguration access list (RAL) (also referred to as a candidate list) specifying, in accordance with the principles of the present invention, which of logical partitions 102 can potentially access the particular channel path. In one embodiment, the reconfiguration access list is built and maintained by a known I/O control program described in detail in "Input/Output Configuration User's Guide and ESCON Channel-To-Channel Reference," International Business Machines Corporation Publication No. GC38-0401-01 (May 1994), which is hereby incorporated herein by reference in its entirety.

In accordance with the principles of the present invention, in one embodiment, when a logical partition (i.e., a requesting logical partition) wishes to request information relating to another logical partition (i.e., a requested logical partition), the requesting logical partition issues, for instance, an instruction specifying the requested logical partition. Additionally, in one example, the instruction indicates a specific resource that the requesting logical partition would like information about.

In one particular embodiment of the present invention, the requesting logical partition requests information about a specific resource as that resource relates to other logical partitions of the system. For example, the requesting logical partition may wish to find out information related to a particular channel path that may or may not be configured to other logical partitions of the data processing system. The technique of the present invention is described below as it relates to requesting information related to channel paths. However, the invention is in no way limited to requesting information related to channel paths. It is also possible to request information about any other resources within or associated with the logically partitioned data processing system. Examples of other resources include, but are not limited to, configuration attachment information and utilization data related to shared processors. There are many other examples, as well. The claim appended to the specification reflect such a scope of the invention.

In one specific example of the present invention, the requesting logical partition issues a channel subsystem call instruction (CHSC instruction), one example of which is depicted in FIG. 2, and described in detail below. In one embodiment, a channel subsystem call instruction 200 includes an operation code (op code) 202 specifying that this is a channel subsystem call instruction to be executed by I/O processor 106, and a register 204 pointing to the beginning of a block (e.g., a 4 k block) that includes, for example, information regarding the requesting and requested logical partitions and the requested resource.

Figure 4:
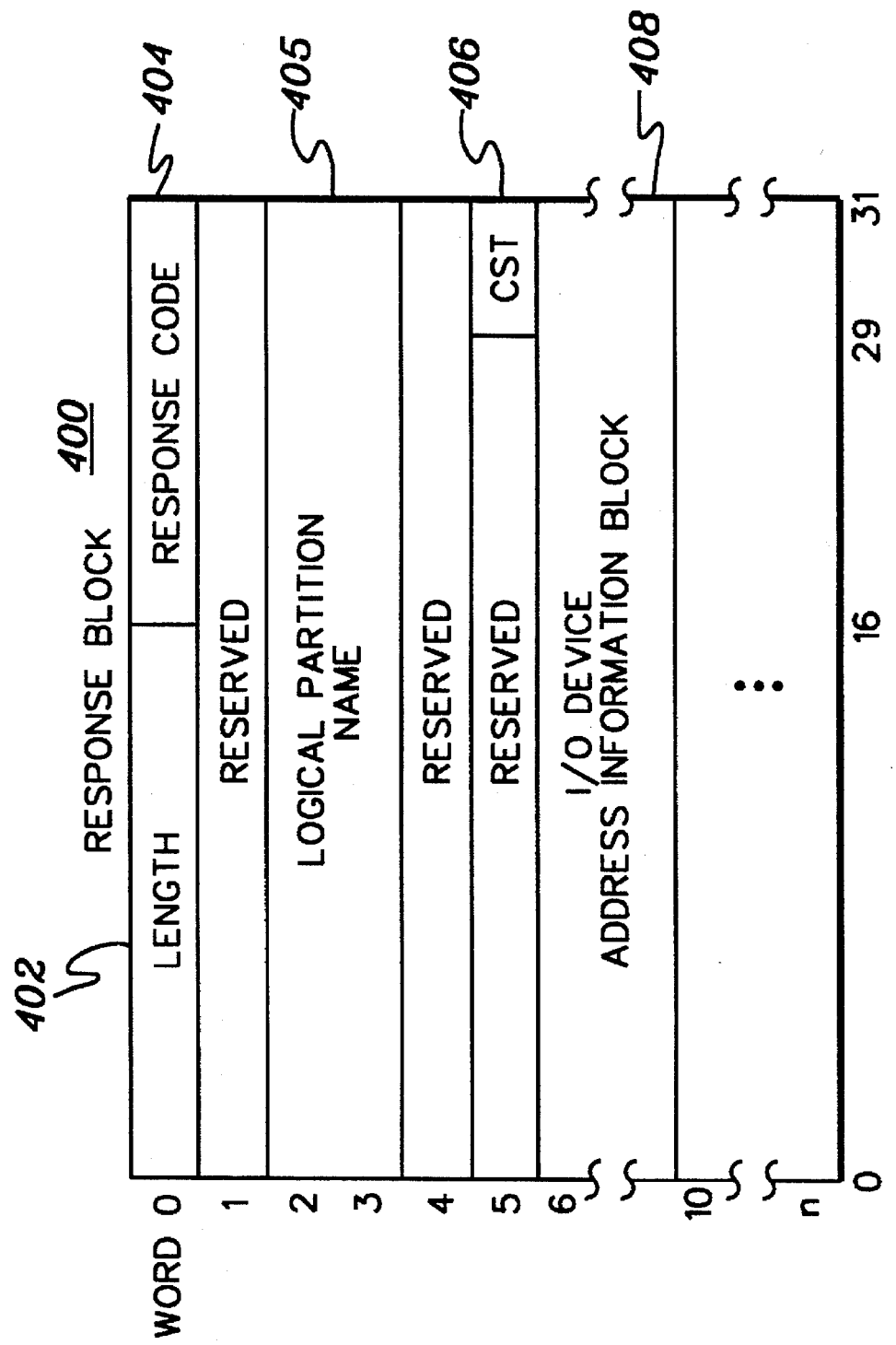
FIG. 4 illustrates one embodiment of a response block returned by the channel subsystem call instruction of FIG. 2, which includes the requested information, in accordance with the principles of the present invention.

In particular, in one embodiment, register 204 is a pointer to a block that includes a request block 300 (FIG. 3) and a response block 400 (FIG. 4), each of which is described in detail below.

In one embodiment, request block 300 is built by the requesting logical partition, and includes, for instance, the following fields:

(a) A Length Field 302: In one example, bytes 0–1 of word 0 specify a command request block length of, for instance, 16 bytes. It will be apparent to those of ordinary skill in the art that the command request block can be of various sizes and 16 bytes is only one example.

(b) A Command Code 304: In one embodiment, bytes 2–3 of word 0 contain a command code specifying that the command to be performed is a store I/O device address information command, in accordance with the principles of the present invention. The store I/O device address information command is used to obtain, for instance, the subchannel number, unit address, and device number for the I/O devices that are attached to the requested channel path for the requested logical partition.

As is known, the I/O devices for the logically partitioned data processing system are described in an I/O configuration definition, which is stored in HSA 110. The I/O configuration definition also includes the reconfiguration access list, described above.

(c) An Image ID (IID) field 306: The IID field (e.g., byte 0 of word 1) is used to specify an identifier of the requesting logical partition. Initially, the IID field contains a zero and is ignored. However, during execution of the instruction, the IID field may be loaded with a value, as is described in detail below.

(d) A First Subchannel Number 308: In one example, bytes 2–3 of word 1 specify the subchannel number identifying the first subchannel for which information is requested.

(e) A Requested Image Identifier (RIID) 310: In one example, byte 0 of word 2 contains the requested image identifier field (RIID). That is, the identifier of the requested logical partition. When the CPC is operating in LPAR mode and the value in the RIID field is other than zero, the field contains the image identifier of the logical partition for which the I/O device address information blocks are to be returned in response block 400. In one example, only those devices for the specified subchannels and requested image identifier are returned in response block 400, as described in detail below.

When the CPC is operating in LPAR mode and the RIID field contains a value of zero, the image identifier of the logical partition for which the I/O device address information blocks are to be returned in the response block is the image identifier of the partition executing the command. In one example, only those devices for the specified subchannels and requested image identifier are returned in response block 400, as described in detail below.

When the CPC is operating in basic mode, byte 0 of word 2 has no meaning, is set to zeros, and is not used as a qualifier for the I/O device address information blocks to be returned in the response block.

(f) A Last Subchannel Number 312: In one example, bytes 2–3 of word 2 specify the subchannel number identifying the last subchannel for which information is requested. The value in bytes 2–3 of word 2 is equal to or greater than the value specified in bytes 2–3 of word 1.

(g) A Channel Path Identifier (CHPID) 314: In one example, byte 3 of word 3 specifies the channel path for which information is requested. The CHPID specifies the channel path identifier for the channel path being requested.

It will be apparent to one of ordinary skill in the art that the above described fields are only one example, and that request block 300 may include fewer or more fields in other embodiments. Also, it will be apparent that the building of the request block is only one specific example. One may decide not to build a block. Instead, in other embodiments, the desired information can simply be part of the instruction itself or passed to the processor executing the instruction. The scope of the appended claims reflect all of these embodiments plus many others.

The store I/O device address information command is executed synchronously and can be interpretatively executed under the start interpretive execution (SIE) architecture. SIE is known in the art and is described in International Business Machines Corporation System/370 Extended Architecture (S/370-XA) Interpretative Execution (IBM Publication No. SA22-7095-01), September. 1985 and in U.S. Pat. No. 4,843,541 entitled "Logical Resource Partitioning of A Data Processing System," Bean et al., issued on Jun. 27, 1989 and assigned to International Business Machines Corporation, each of which is hereby incorporated herein by reference in its entirety.

During execution of the store I/O device address information command, information regarding the requested resource is returned to the requesting logical partition via instruction 200, and in particular, command response block 400. In one embodiment, command response block 400 includes the following fields:

(a) A Length Field 402: In one embodiment, bytes 0–1 of word 0 specify the length in bytes of the command response block. The length depends on the response code that is stored as a result of the attempt to execute the store I/O device address information command of the present invention.

(b) A Response Code 404: In one example, bytes 2–3 of word 0 contain a 16-bit unsigned binary integer that describes the results of the attempt to execute the store I/O device address information command.

(c) A Logical Partition Name 405: In one example, words 2–3 contain an eight character (EBCDIC) logical partition name. The logical partition name is associated with the logical partition identified by the contents of the RIID field of the request block.

(d) A Channel State (CST) 406: In one embodiment, bits 29–31 of word 5 contain a value which specifies the state of the channel based on the RIID when the command was executed. The values include, for instance:

| Value | Channel State |
|---|---|
| 0 | Invalid |
| 1 | Configured |
| 2 | Standby |
| 3 | Reserved |
| 4 | Not Recognized |
| 5 | Not Configured |
| 6 | Recognized |
| 7 | Invalid |

(e) I/O Device Address Information Block 408: In one embodiment, up to 253 16-byte I/O device address information blocks are stored in the response data area (i.e., field 408) of the command response block when response code 404 indicates that such information should be stored here. The number of I/O device address information blocks stored depends on the number of subchannels in the range specified in command request block 300, conditions in the channel subsystem when the channel subsystem call instruction is executed, and the channel subsystem model. As an example, at least one I/O device address information block is stored, and the actual number of blocks stored is determined by subtracting 24 bytes from the size of the command response block and dividing the remainder by 16.

In one embodiment, I/O device address information blocks are stored for some or all of the specified subchannels within the range of subchannels specified in the request block. Further, as an example, I/O device address information blocks are stored in ascending order of subchannel numbers.

One embodiment of I/O device address information block 408 is depicted in FIG. 5 and includes, for instance, the following fields:

(a) A Subchannel Number 502: In one embodiment, bytes 2–3 of word 0 specify the subchannel associated with the I/O device to which the information in this I/O device address information block applies.

(b) A Last (L) Bit 504: As an example, bit 0 of word 1, when one indicates that the subchannel number specified in bytes 2–3 of word 0 is the highest numbered subchannel associated with an I/O device attached to the specified channel path.

(c) An Accessible (A) Bit 506: In one embodiment, bit 1 of word 1, when one indicates that the device specified in bytes 2–3 of word 2 is accessible to the specified logical partition based on a path availability mask (PAM) bit in the subchannel information block (SCHIB) for the specified channel path. (As is known, the PAM bit indicates which paths in the subchannel are physically available.)

(d) A Subchannel Enabled (E) Bit 508: In one example, bit 15 of word 1 contains the value of the enabled bit of a path-management-control word (PMCW), (bit 8 of word 1 of PMCW), at the time the command was executed.

The PAM bit, the SCHIB, the PMCW and the subchannel enabled bit are described in detail in Enterprise Systems Architecture/390 Principles of Operation, International Business Machines Corporation Publication No. SA22-7201-02, (December 1994), which is incorporated herein by reference in its entirety.

(e) A Unit Address 510: In one embodiment, byte 3 of word 1 contains the unit address of the I/O device associated with the specified subchannel.

(f) Device Number 512: As an example, bytes 2–3 of word 2 contain the binary representation of the hexadecimal four-digit device number of the I/O device associated with the specified subchannel. The device number is a logical partition unique parameter that is assigned to the device when it is defined to the channel subsystem.

(g) Control Unit Number 514: In one example, bytes 2–3 of word 3 contain a control unit number. The control unit number uniquely identifies a control unit that can be used to access the I/O device associated with the specified subchannel.

It will be apparent to those of ordinary skill in the art that the formats and fields of instruction 200, request block 300, response block 400 and I/O device address information block 408 can be different than that described above. For example, more or less of the fields can be used. Further, if for instance, information about subchannels was not requested, then the fields relating to subchannels can be ignored. Additionally, if information about other resources is requested, then the blocks would reflect such information and resources. The above is only one embodiment of the invention and the invention, as defined in the claims, is not limited by this example.

The store I/O device address information command can be executed by CPC 100 when the CPC is running in basic mode or LPAR mode. Additionally, the command can be executed in pass-through mode (i.e., SIE is active) or with pass-through mode turned off (i.e., SIE inactive). One mechanism for determining whether pass-through mode is active or inactive, is by having hypervisor 104 (FIG. 1) set the value of a bit stored in the active SIE state descriptor. This bit represents the command code for the store I/O device address information command. If the bit is set on (e.g., to one), then pass-through mode is active for the command. However, if the bit is set off (e.g., to zero), then pass-through mode is inactive.

In one embodiment, the bit is set on when global access is authorized for a particular logical partition, such as the requesting logical partition. When a logical partition is given global access, it has authority to access and retrieve information concerning resources as those resources relate to other logical partitions. In accordance with the principles of the present invention, a requesting logical partition cannot gain access to information relating to logical partitions unless global access is authorized.

If global access is permitted, then hypervisor 104 allows instruction 200 to stay in pass-through mode and the instruction goes straight from the requesting logical partition to the central processor microcode and it is executed by the I/O processor. The I/O processor obtains the image identifier (IID) of the requesting logical partition from, for instance, the SIE state descriptor. This IID is used during processing of the store I/O device address information command, as is described in detail below.

If global access is not granted, then hypervisor 104 intercepts the request block, makes a copy of the request block and stores it in LPAR storage 124. Hypervisor 104 fills in the IID, since it knows which logical partition issued the instruction. The hypervisor then checks to see if the requesting logical partition is requesting access to information relating to its own resources. This check is necessary, since global authority has not been provided. One embodiment of this check is described below.

In particular, in one example, the identifier of the requested logical partition (RIID) is checked to see if it is equal to zero. When it is equal to zero, the RIID is set equal to the IID. Thereafter, or if the RIID is not equal to zero, then a determination is made as to whether the requesting logical partition is authorized for global access (i.e., is the bit on). If the bit is not on, then a further check is made to see if the requesting logical partition is requesting information about its own resources. If the requesting logical partition is authorized for global access or the requested access is for a partition's own resources, then the command continues executing. However, if global access is denied and the requesting logical partition is asking for information relating to other logical partitions, then the hypervisor terminates the command.

After determining that the instruction is authorized to execute, hypervisor 104 reissues the instruction to the central processor, which passes the instruction onto the I/O processor for execution. The I/O processor processes the instruction as described below using the IID received from the hypervisor.

Figure 6:
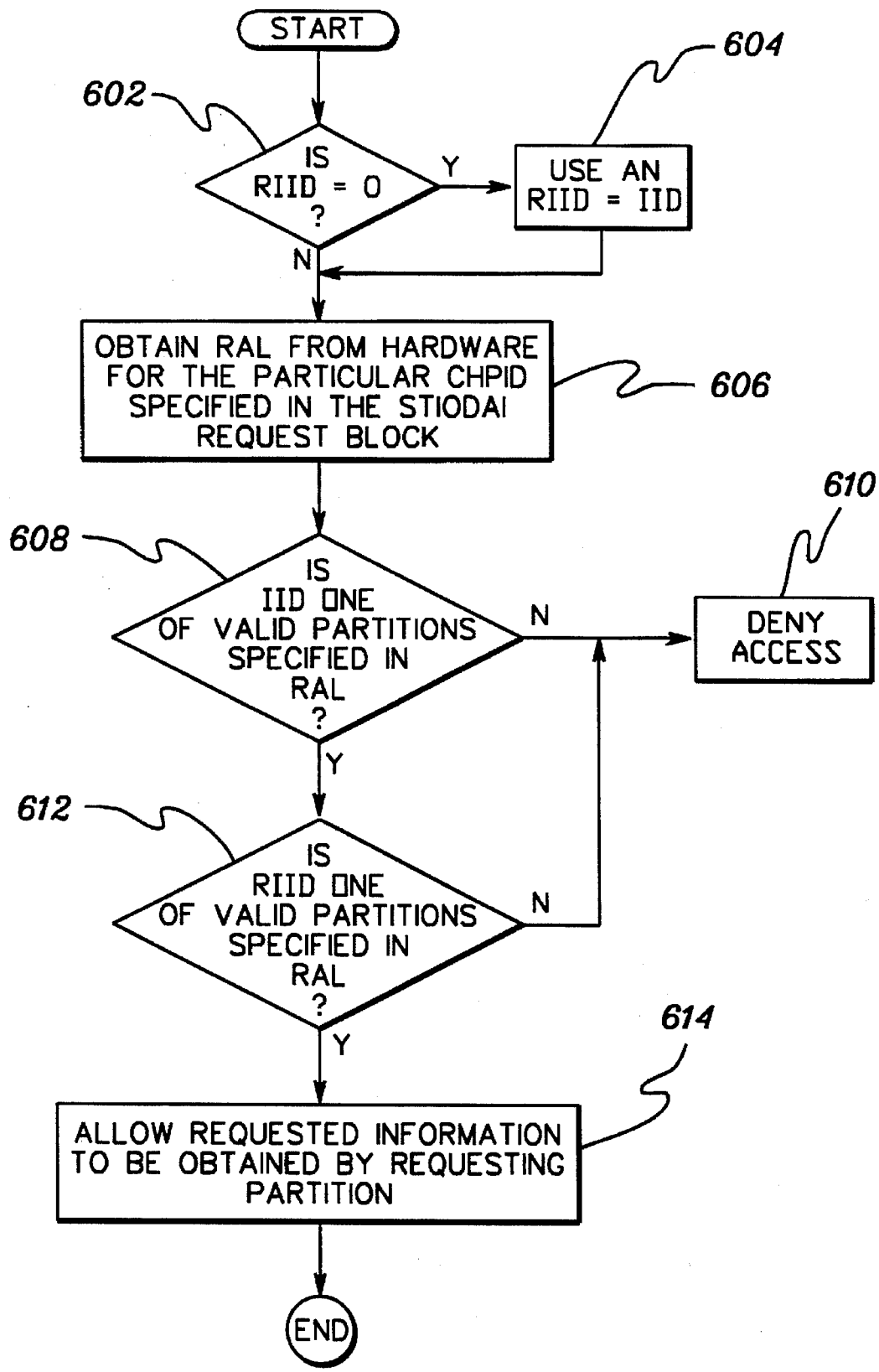
FIG. 6 depicts one example of the flow associated with the access mechanism of the present invention initiated by the channel subsystem call instruction of FIG. 2, in accordance with the principles of the present invention.

One example of the logic associated with the store I/O device address information command is depicted in FIG. 6 and described in detail below. Initially, a determination is made as to whether the identifier of the requested logical partition (i.e., RIID) is equal to 0, INQUIRY 602, "IS RIID EQUAL 0?" When the requested identifier is equal to 0, the requesting partition is requesting information about itself, and thus, the RIID is set equal to the image ID, STEP 604, "USE AN RIID=IID." However, if the RIID is not equal to zero, or after the RIID is set equal to the IID, the appropriate reconfiguration access list (RAL) is obtained from hardware system area 110, STEP 606.

In particular, the reconfiguration access list for the CHPID specified in request block 300 is obtained in order to determine if the requesting logical partition and the requested logical partition are permitted access to information relating to the channel path specified by the CHPID. In one example, a determination is made as to whether the IID is one of the valid partitions specified in the RAL, INQUIRY 608 "IS IID ONE OF VALID PARTITIONS SPECIFIED IN RAL?" If the IID is not located in the RAL and thus, it is not a valid partition, then access to information about the CHPID is denied, STEP 610 "DENY ACCESS."

However, if the logical partition specified by the IID is a valid partition, then a further determination is made as to whether the requested logical partition is allowed to have access to information relating to the channel path represented by the CHPID, INQUIRY 612, "IS RIID ONE OF VALID PARTITIONS SPECIFIED IN RAL?" Once again, if the requested partition is not authorized to access the specified channel path, then access is denied. When the requesting and requested logical partitions are both specified in the reconfiguration access list for the specified resource (e.g., CHPID) then the requesting partition is permitted to receive information about the channel path as it relates to the requested partition, STEP 614.

It will be apparent to those of ordinary skill in the art that even though the above flow logic is described in detail with reference to a particular resource, (i.e., the CHPID), that the flow logic is applicable to other resources as well.

Figure 7:
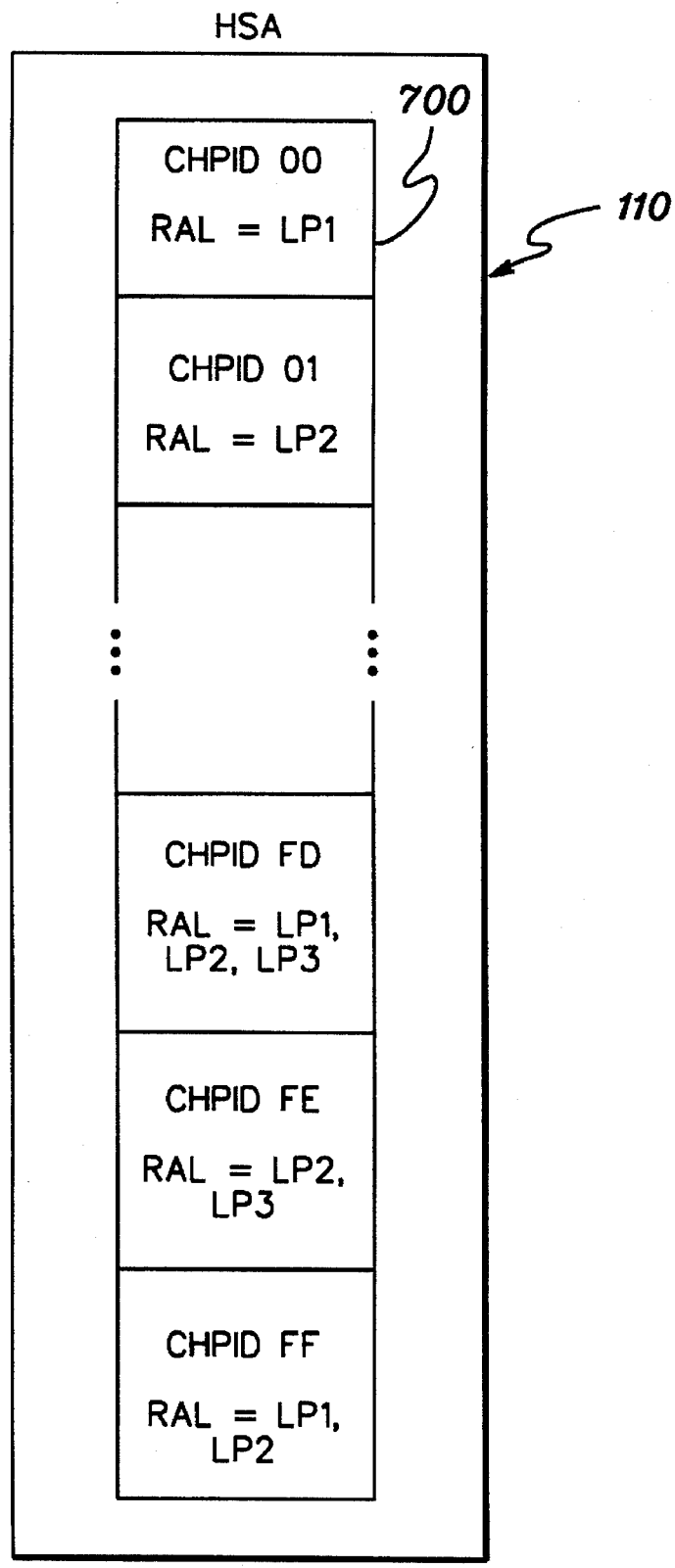
FIG. 7 illustrates one embodiment of an expanded view of the hardware system area of FIG. 1, in accordance with the principles of the present invention.

The following are examples offered to enhance the understanding of the technique described in detail above with reference to FIG. 6. For clarity purposes, reference is made to FIG. 7, which depicts an expanded view of hardware system area 110. Shown in FIG. 7 is a control block 700 for each channel path of FIG. 1. In one example, each control block identifies the channel path identifier (CHPID) and the logical partitions (i.e., operating system images) that the identified channel path is permitted to be configured to. These control blocks are referenced in the following examples:

Ex. 1. If global access is granted and LP1 requested information pertaining to CHPID FD as it relates to the logical partitions identified by RIID =0, 1, 2 or 3, information access would be granted, since LP1, LP2, and LP3 are on the RAL. (Note: RIID =0 is equivalent to the requesting logical partition, which in this instance is LP1.)

EX. 2. If global access is granted and LP1 requested information pertaining to CHPID FE as it relates to the logical partitions identified by RIID =2 or 3, information access would be denied, since LP1 is not on the RAL.

Ex. 3. If global access is granted and LP1 requested information pertaining to CHPID FF as it relates to the logical partitions identified by RIID =0, 1, or 2, information access would be granted, since LP1 and LP2 are on the RAL.

Ex. 4. If global access is granted and LP1 requested information pertaining to CHPID FF as it relates to the logical partition identified by RIID=3, information access would be denied, since LP3 is not on the RAL.

Ex. 5. If global access is not granted and LP1 requested information pertaining to CHPID FD as it relates to the logical partitions identified by RIID=0 or 1, information access would be granted, since LP1 is only requesting information about itself. In that case, global access is not necessary.

Ex. 6. If global access is not granted and LP1 requested information pertaining to CHPID FD as it relates to the logical partitions identified by RIID=2 or 3, information access would be denied, since LP1 is not allowed access to information for any other partitions than itself.

Described in detail above is one embodiment of a limited access mechanism in which information about a resource as it relates to the logical partitions having authority to access the resource is provided to a requesting logical partition. This enables the requesting logical partition to manage the resource from a central location without having direct communication with each logical partition of the data processing system. Access to the information is granted on a per resource basis, and the requesting logical partition can have access to information relating to less than all of the logical partitions of the data processing system.

The technique of the present invention is applicable in any situation in which one logical partition of a logically partitioned data processing system requires information pertaining to other logical partitions of the system. In one example, however, the technique is used by an open system adapter (OSA) support facility (OSA/SF) that requires configuration information about input/output devices defined to and shared by channels (such as, for example, OSA channels). In one example, OSA/SF, which runs under a system control program of a logical partition, uses this information to set up control information to allow the logical partitions to use the OSA channels. Since the channels and devices are shared, OSA/SF requires the return of configuration information not only pertinent to the logical partition from which OSA/SF is running, but also from other logical partitions sharing the channels.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. An access method in a logically partitioned data processing system comprising a plurality of logical partitions, said access method comprising:

requesting access by a first logical partition of said plurality of logical partitions to information pertaining to a resource of said logically partitioned data processing system as said resource relates to a second logical partition of said plurality of logical partitions, each of said first logical partition and said second logical partition executing a system control program;

determining whether said first logical partition is authorized to access said information, wherein said determining, comprises establishing whether said first logical partition and said second logical partition have authority to access said resource; and allowing said first logical partition to access said information when said determining indicates said first logical partition and said second logical partition have authority to access said resource.

2. The method of claim 1, wherein said requesting comprises issuing an instruction by said first logical partition requesting access to said information, said instruction comprising a resource identifier indicating said resource and a requested identifier specifying said second logical partition.

3. The method of claim 2, wherein said establishing comprises determining whether said requested identifier is specified on an authorization list for said resource, wherein said second logical partition has authority to access said resource when said requested identifier is specified.

4. The method of claim 3, wherein said first logical partition comprises a requesting identifier and said establishing further comprises determining whether said requesting identifier is specified on said authorization list, wherein said first logical partition has authority to access said resource when said requesting identifier is specified.

5. The method of claim 2, wherein said logically partitioned data processing system further comprises an input/output processor coupled to said plurality of logical partitions and one or more input/output devices coupled to said input/output processor, and wherein said instruction is executed by said input/output processor.

6. The method of claim 5, wherein said resource comprises a path between said input/output processor and one of said one or more input/output devices, and wherein said instruction returns to said first logical partition information regarding said path.

7. The method of claim 1, further comprising initially determining whether said first logical partition has authority to access partition information relating to any of said plurality of logical partitions other than its own logical partition.

8. The method of claim 7, further comprising denying access by said first logical partition to said information when said initially determining indicates said first logical partition does not have said authority.

9. An access method in a logically partitioned data processing system comprising at least three logical partitions, said access method comprising:

requesting access by a first logical partition of said at least three logical partitions to partition information relating to a second logical partition of said at least three logical partitions, each of said first and second logical partitions executing a system control program;

determining whether said first logical partition is authorized to access said partition information, said first logical partition having authority to access information for less than all of said at least three logical partitions in said logically partitioned data processing system; and allowing said first logical partition to access said partition information when said determining indicates said first logical partition is authorized.

10. The access method of claim 9, wherein said requesting comprises requesting access to partition information pertaining to a resource of said logically partitioned data processing system, and wherein said determining comprises establishing whether said first logical partition and said second logical partition have authority to access said resource, wherein said first logical partition is authorized to access said partition information when said first logical partition and said second logical partition have authority to access said resource.

11. The method of claim 10, wherein said establishing comprises checking an authorization list for said resource to determine whether said first logical partition and said second logical partition are located on said authorization list.

12. The method of claim 10, wherein said requesting comprises issuing an instruction by said first logical partition requesting access to said partition information.

13. A logically partitioned data processing system comprising:

a plurality of logical partitions, a first logical partition of said plurality of logical partitions programmable to request access to information pertaining to a resource of said logically partitioned data processing system as said resource relates to a second logical partition of said plurality of logical partitions, wherein a system control program is executable by said first logical partition and said second logical partition; and a processor coupled to said plurality of logical partitions, said processor programmable to determine whether said first logical partition is authorized to access said information and whether said first logical partition and said second logical partition have authority to access said resource, wherein said processor allows said first logical partition to access said information when said first logical partition and said second logical partition have authority to access said resource.

14. The logically partitioned data processing system of claim 13, wherein said first logical partition is further programmable to issue an instruction requesting access to said information, said instruction comprising a resource identifier indicating said resource and a requested identifier specifying said second logical partition.

15. The logically partitioned data processing system of claim 14, further comprising an authorization list for said resource, wherein said processor is further programmable to determine whether said requested identifier is specified on said authorization list, wherein said second logical partition has authority to access said resource when said requested identifier is specified.

16. The logically partitioned data processing system of claim 15, wherein said first logical partition comprises a requesting identifier, and wherein said processor is further programmable to determine whether said requesting identifier is specified on said authorization list, wherein said first logical partition has authority to access said resource when said requesting identifier is specified.

17. The logically partitioned data processing system of claim 16, further comprising one or more input/output devices coupled to said processor, wherein said processor is further programmable to execute said instruction, and wherein said resource comprises a path between said processor and one of said input/output devices, said instruction to return information regarding said path to said first logical partition.

18. The logically partitioned data processing system of claim 13, further comprising a hypervisor coupled to said plurality of logical partitions and said processor, said hypervisor programmable to initially determine whether said first logical partition has authority to access partition information relating to any of said plurality of logical partitions other than its own logical partition.

19. The logically partitioned data processing system of claim 18, wherein said hypervisor is further programmable to deny access to said information when said first logical partition does not have said authority.

20. A logically partitioned data processing system comprising:
   at least three logical partitions, a first logical partition of said at least three logical partitions programmable to request access to partition information relating to a second logical partition of said at least three logical partitions, wherein a system control program is executable by said first logical partition and said second logical partition; and
   a processor coupled to said at least three logical partitions, said processor programmable to determine whether said first logical partition is authorized to access said partition information, said first logical partition having authority to access information for less than all of said at least three logical partitions, wherein said processor allows said first logical partition to access said partition information when said first logical partition is authorized.

21. The logically partitioned data processing system of claim 20, wherein said first logical partition is further programmable to request access to partition information pertaining to a resource of said logically partitioned data processing system, and wherein said processor is further programmable to establish whether said first logical partition and said second logical partition have authority to access said resource, wherein said first logical partition is authorized to access said partition information when said first logical partition and said second logical partition have authority to access said resource.

22. The logically partitioned data processing system of claim 21, further comprising an authorization list for said resource, and wherein said processor is further programmable to determine whether said first logical partition and said second logical partition are located on said authorization list.

23. The logically partitioned data processing system of claim 20, wherein said first logical partition is further programmable to issue an instruction to request access to said partition information.

24. An access system in a logically partitioned data processing system comprising a plurality of logical partitions, said access system comprising:
   means for requesting access by a first logical partition of said plurality of logical partitions to information pertaining to a resource of said logically partitioned data processing system as said resource relates to a second logical partition of said plurality of logical partitions, each of said first logical partition and said second logical partition executing a system control program;
   means for determining whether said first logical partition is authorized to access said information, said determining means comprising means for establishing whether said first logical partition and said second logical partition have authority to access said resource; and
   means for allowing said first logical partition to access said information when said determining means indicates said first logical partition and said second logical partition have authority to access said resource.

25. An access system in a logically partitioned data processing system comprising at least three logical partitions, said access system comprising:
   means for requesting access by a first logical partition of said at least three logical partitions to partition information relating to a second logical partition of said at least three logical partitions, each of said first and second logical partitions executing a system control program;
   means for determining whether said first logical partition is authorized to access said partition information, said first logical partition having authority to access information for less than all of said at least three logical partitions in said logically partitioned data processing system; and
   means for allowing said first logical partition to access said partition information when said determining means indicates said first logical partition is authorized.

26. The access system of claim 25, wherein said requesting means comprises means for requesting access to partition information pertaining to a resource of said logically partitioned data processing system, and wherein said determining means comprises means for establishing whether said first logical partition and said second logical partition have authority to access said resource, wherein said first logical partition is authorized to access said partition information when said first logical partition and said second logical partition have authority to access said resource.

* * * * *